US007036535B1

(12) United States Patent
Chandler

(10) Patent No.: US 7,036,535 B1
(45) Date of Patent: May 2, 2006

(54) METHOD AND APPARATUS FOR MEASURING, TEMPERING AND DISPENSING WATER DURING THE MIXING OF BATTERS

(76) Inventor: Jeffrey Chandler, 60 Tyler City Rd., Orange, CT (US) 06477

( * ) Notice: Subject to any disclaimer, the term of this patent is extended or adjusted under 35 U.S.C. 154(b) by 390 days.

(21) Appl. No.: 10/613,872

(22) Filed: Jul. 3, 2003

(51) Int. Cl.
*B65B 1/04* (2006.01)
(52) U.S. Cl. .................. 141/82; 222/146.2; 222/54
(58) Field of Classification Search ............... 141/82; 222/146.1–146.5, 54
See application file for complete search history.

(56) References Cited

U.S. PATENT DOCUMENTS

| 4,015,749 A | * | 4/1977 | Arzberger et al. | 222/640 |
| 4,651,862 A | * | 3/1987 | Greenfield, Jr. | 194/344 |
| 4,964,732 A | | 10/1990 | Cadeo et al. | |
| 5,145,253 A | | 9/1992 | Paul et al. | |
| 5,537,914 A | | 7/1996 | Gibney et al. | |
| 5,653,533 A | | 8/1997 | Green | |
| 5,678,734 A | * | 10/1997 | Walker | 222/146.5 |
| 6,082,247 A | * | 7/2000 | Beaulicu | 99/302 R |

OTHER PUBLICATIONS

Hobart Food Equipment, HWM Water Meter Spec Sheets, Hobart Corporation, Troy, OH, copyright 2002.

\* cited by examiner

*Primary Examiner*—Steven O. Douglas
(74) *Attorney, Agent, or Firm*—Ware, Fressola, Van der Sluys & Adolphson LLP

(57) ABSTRACT

A method and apparatus allows for control of the temperature and quantity of water added to a mixing bowl during the mixing of batters used for muffins, cakes and the like. A reservoir tank with graduations thereon is provided with appropriate water lines for filling the reservoir tank with a desired amount of measured and tempered water. A temperature measuring device is used for measuring the temperature of the water in the reservoir tank. Appropriate valving connected to the reservoir tank permits dispensing of the water at a controlled rate into (1) the mixing bowl, (2) a bypass line if the operator desires to rinse residual ingredients (eggs, oil, molasses etc.) from smaller measuring containers and pour them into the mixing bowl or (3) a waste line. An overflow port system is provided on the reservoir tank to prevent overfilling thereof.

20 Claims, 2 Drawing Sheets

METHOD AND APPARATUS FOR MEASURING, TEMPERING AND DISPENSING WATER DURING THE MIXING OF BATTERS

BACKGROUND OF THE INVENTION

1. Technical Field

The present invention relates generally to mixing batters used for muffins, cakes and the like. More particularly, it relates to a method and device which controls the temperature and quantity of water added to a mixing bowl during the mixing of batters.

2. Description of the Background Art

The preparation of batters for use in making muffins, cakes and the like requires the combining of the powdered batter mixture with appropriate amounts of water. Typically, in a small bakery, the desired amount of powdered batter mixture is placed into the large mixing bowl of a commercial style food mixer. Thereinafter, water is added manually to the mixing bowl with a gallon jug at slow rate while mixing the batter. Using this method, it is difficult to control the temperature and volume of the water being added to the powdered mixture.

There are presently a variety of water metering devices commercially available to bakeries for measuring and tempering water prior to mixing with the powered batter mixture. One example is manufactured and distributed by Hobart Corporation of Troy, Ohio. However, these devices can only dispense the water in one fast discharge which is not a suitable way to add water to cake and muffin batters. These units are also electronically controlled, and therefore rather expensive, and intended for use primarily for large dough manufacturers.

SUMMARY OF THE INVENTION

It is an object of the present invention to provide a novel method and apparatus for measuring, tempering and dispensing water for mixing with the powered batter mixtures for muffins, cakes and the like which overcomes the drawbacks of the commercially available water meters.

It is also an object to provide such a method and apparatus which allows a baker to easily adjust the temperature of water, measure a desired amount of water and discharge the water into a powdered batter mixture in a mixing bowl at a slow controllable rate to improve the consistency of batters.

Still another object is to provide such a method and apparatus which provides small bakeries with a inexpensive and easy to operate water measuring device that is more sanitary than gallon jugs.

It is an additional object to provide such a method and apparatus which allows the baker to perform other duties while dispensing the water into the mixing bowl and reduces splash-out from the mixing bowl to keep work areas cleaner and safer.

A further object is to provide such an apparatus which may be readily and economically fabricated and will enjoy a long life in operation.

It has now been found that the foregoing and related objects can be readily attained in an apparatus which can be used in a method for control of the temperature and quantity of water added to a mixing bowl during the mixing of batters used for muffins, cakes and the like, the method comprising the steps of:

(a) providing a reservoir tank for containing a desired quantity of water;

(b) providing an initial quantity of water in the reservoir tank utilizing inlet valving;

(c) providing a temperature measuring device for measuring the temperature of the water in the reservoir tank;

(d) measuring the temperature of the initial quantity of water using the temperature measuring device;

(e) adjusting the temperature of the initial quantity of water by adding an additionally quantity of water so as to obtain a desired quantity of water at a desired temperature; and (f) utilizing outlet valving connected to the reservoir tank to dispense the desired quantity of water at an adjustable controlled rate into the mixing bowl.

Desirably, an overflow port system is provided on the reservoir tank to prevent overfilling thereof with water. The overflow port system on the reservoir tank has a trap system therein to prevent contaminants from entering the reservoir tank and a waste line connected thereto allowing any excess water to be drained from the reservoir tank for disposal. The waste line is also connected to the outlet valving and allows any excess water to be drained from the reservoir tank for disposal.

According to the invention, graduations are included on the reservoir tank so the desired quantity of water can be accurately measured.

Conveniently, a bypass line is connected to the outlet valving and allows residual ingredients to be rinsed from smaller measuring containers into the mixing bowl.

In still another feature, a check valve connected to the reservoir tank allows air to enter the reservoir tank as water is drained therefrom.

In yet another feature, the temperature measuring device is a digital temperature measuring device and includes a temperature probe inserted in the water to measure the temperature thereof.

The invention will be fully understood when reference is made to the following detailed description taken in conjunction with the accompanying drawings.

DETAILED DESCRIPTION OF THE INVENTION

Figure 1:
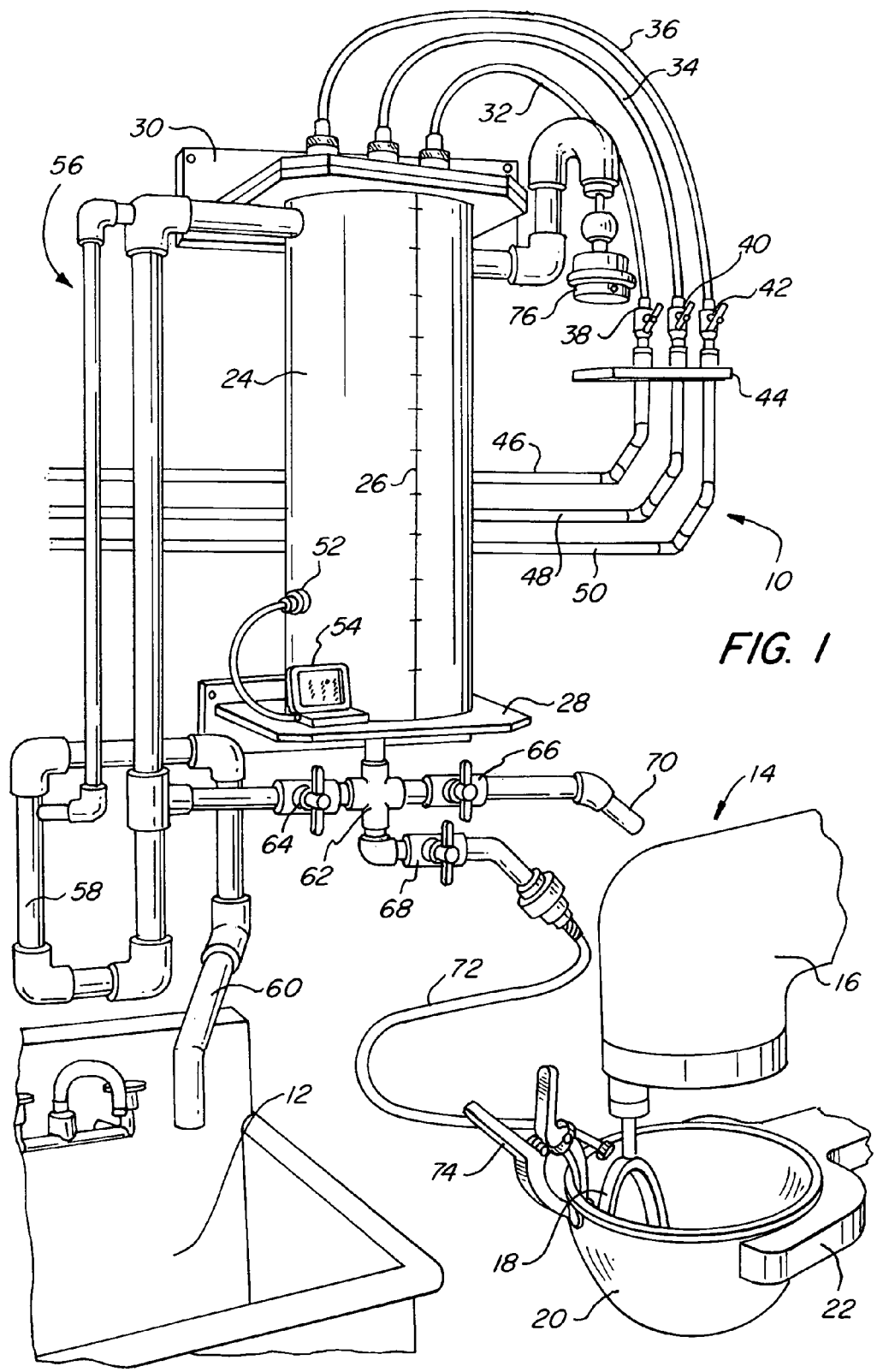
FIG. 1 is a perspective view of the apparatus of the present invention for measuring, tempering and dispensing water during the mixing of batters.

Turning first to FIG. 1 of the drawings, therein illustrated is an apparatus for measuring, tempering and dispensing water for mixing with the powered batter mixtures for muffins, cakes and the like which is generally designated by the numeral 10 and made in accordance with the present invention. The apparatus 10 is mounted on a wall above a wall sink 12 (or, alternatively, a drain) and is used in conjunction with a standard mixing device generally designated by the numeral 14 which can be of the type made by Hobart Corporation, 701 South Ridge Avenue, Troy Ohio 45374. The mixing device 14 is shown with a mixing head 16, beater attachment 18, a mixing bowl 20 and a mixing bowl holder 22. Such mixing devices are very well known in the art so the structure and function thereof will be not be explained in detail.

The apparatus 10 for measuring, tempering and dispensing water has a five gallon, clear cylinder shaped water reservoir tank 24 with graduations 26 thereon for indicating the volume of water therein. The reservoir tank 24 is removably mounted to the wall by two noncorrosive brackets 28, 30. The bottom of the reservoir tank 24 is secured in a water tight manner to the lower bracket 28 while a polymeric O-ring (not shown) is used to provide a water tight seal between the upper bracket 30 and the reservoir tank 24. For introducing water into the reservoir tank 24, three inlet hoses 32, 34, 36 are mounted on the top of the reservoir tank 24 and respectively connected to three inlet valves 38, 40, 42 which extend upwardly from wall mounted bracket 44. The inlet valves 38, 40, 42 are respectively connected to water lines 46, 48, 50 for introductory hot water, cold water and chilled water into the reservoir tank 24.

Extending through a lower part of the reservoir tank 24 is a temperature probe 52 of a digital thermometer 54 so the operator may monitor the water temperature within the reservoir tank 24. The digital thermometer 54 can be seated on the lower bracket 28 as shown or be mounted in some other convenient place.

On one side of the reservoir tank 24 just below the upper bracket 30 is an overflow port system generally indicated by numeral 56 that will discharge excess water into the wall sink 12 through a trap system 58 and waste line 60 in the overflow port system 56 if the reservoir tank 24 is overfilled. In a well known manner, one side of the overflow port system 56 allows water to flow from the reservoir tank 24 while the other side allows air to escape therefrom. The trap system 58 in the overflow port system 56 prevents contaminants from entering the reservoir tank 24 while the apparatus 10 is idle.

In communication with the bottom of the reservoir tank 24, there is t-shaped pipe system 62 with a purge bypass valve 64, a rinse bypass valve 66 and a measured water release valve 68, each is manually operated and performs a separate operation. The purge bypass valve 64 releases unwanted water from the reservoir tank 24 into the wall sink 12 through the trap system 58 and the waste line 60 of the overflow port system 56. The rinse bypass valve 66 releases measured water from the reservoir tank 24 into a bypass line 70 if the operator desires to rinse residual ingredients (eggs, oil, molasses etc.) from smaller measuring containers and pour them into the mixing bowl 20. The measured water release valve 68 releases measured water from the reservoir tank 24 into the mixing bowl 20. The measured water release valve 68 is manually actuated by the operator to release the measured water from the reservoir tank 24 at a controlled rate. The measured water is guided to the mixing bowl 20 by a flexible hose 72 that fastens to the top of the mixing bowl 20 with a spring clamp 74 which is easily attached and detached therefrom.

At the top of the reservoir tank 24 there is a filtered check valve 76 that permits filtered air to enter the reservoir tank 24 while water drains from the reservoir tank 24 when the operator uses the purge bypass valve 64, rinse bypass valve 66 or measured water release valve 68. The operation of the filtered check valve 76 prevents water from coming out of the reservoir tank 24 through the filtered check valve 76 in an overflow situation.

Figure 2:
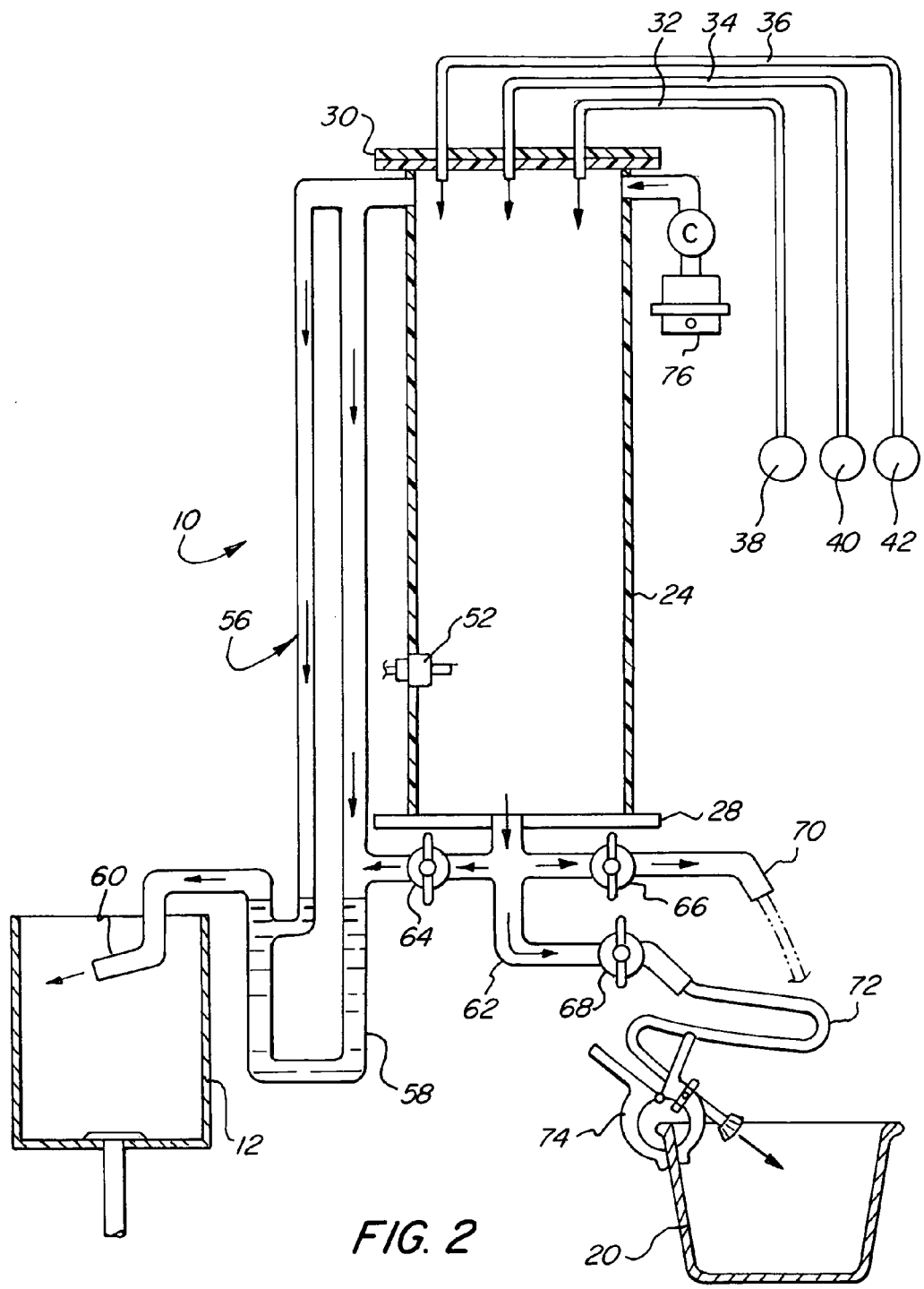
FIG. 2 is a schematic view of the apparatus of the present invention for measuring, tempering and dispensing water during the mixing of batters.

The operation of the invention can be best understood from FIG. 2. To measure, temper and dispense water with the apparatus 10, the purge bypass valve 64, rinse bypass valve 66 and measured water release valve 68 must be in their closed position before filling the reservoir tank 24. The operator can then open the desired water inlet valves 38, 40 and/or 42 to fill the reservoir tank 24 with an initial quantity of water until the thermometer probe 52 is submerged. The operator can feed additional hot, cold or chilled water into the reservoir tank 24 using the inlet valves 38, 40 and/or 42 to alter the temperature of the initial quantity of water to a desired temperature and to obtain a desired quantity of water. The desired quantity of water is usually governed by the amount of water needed to be mixed with the powdered batter mixture present in the mixing bowl 20 and is measured using the graduations 26 on the reservoir tank 24. When the reservoir tank 24 is filled with the desired quantity of water using the graduations 26, the water inlet valves 38, 40 and/or 42 are then shut off. If the reservoir tank 24 is over filled, or if the water temperature is not satisfactory, unwanted water can be discharged by opening the purge bypass valve 64. After the desired temperature and quantity of water are achieved, the flexible hose 72 is attached to the mixing bowl 20 with the spring clamp 74. With the mixing device 14 running, the measured and tempered water can then be discharged into the mixing bowl 20 by using the measured water release valve 68. Adjusting the measured water release valve 68 can alter the rate of water flow being discharged into the mixing bowl at a slow controllable rate desirable during the mixing batters for muffins, cakes and the like.

It should be appreciated that the entire apparatus 10 of the present invention is completely sealed and water tight, so that in the event of an overflow, all the overflow water will be discharged through the waste line 60.

Thus, it can be seen from the foregoing specification and attached drawings that the method and apparatus of the present invention allows an operator to adjust the temperature of water, measure a desired amount of water and discharge the tempered water into a mixing bowl at a slow controllable rate. Such a slow rate is important while mixing batters for muffins, cakes and the like.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

Having thus described the invention, what is claimed is:
1. A method for control of the temperature and quantity of water added to a mixing bowl during the mixing of batters used for muffins, cakes and the like, the method comprising the steps of:
 (a) providing a reservoir tank for containing a desired quantity of water;
 (b) providing an initial quantity of water in the reservoir tank utilizing inlet valving;
 (c) providing a temperature measuring device for measuring the temperature of the water in the reservoir tank;
 (d) measuring the temperature of the initial quantity of water using the temperature measuring device;
 (e) adjusting the temperature of the initial quantity of water by adding an additional quantity of water so as to obtain a desired quantity of water at a desired temperature; and
 (f) utilizing outlet valving connected to the reservoir tank to dispense the desired quantity of water at an adjustable controlled rate into the mixing bowl.

2. A method for control in accordance with claim 1, further comprising the step of providing an overflow port system on the reservoir tank to prevent overfilling thereof with water.

3. A method for control in accordance with claim 2, wherein the overflow port system on the reservoir tank has a trap system therein to prevent contaminants from entering the reservoir tank.

4. A method for control in accordance with claim 2, further comprising the step of providing a waste line connected to the overflow port system for allowing any excess water to be drained from the reservoir tank for disposal.

5. A method for control in accordance with claim 1, further comprising the step of providing graduations on the reservoir tank so the desired quantity of water can be accurately measured.

6. A method for control in accordance with claim 1, further comprising the step of providing a bypass line connected to the outlet valving for allowing residual ingredients to be rinsed from smaller measuring containers into the mixing bowl.

7. A method for control in accordance with claim 1, further comprising the step of providing a waste line connected to the outlet valving for allowing any excess water to be drained from the reservoir tank for disposal.

8. A method for control in accordance with claim 1, further comprising the step of providing a check valve connected to the reservoir tank for allowing air to enter the reservoir tank as water is drained therefrom.

9. A method for control in accordance with claim 1, wherein the temperature measuring device includes a temperature probe inserted in the water to measure the temperature thereof.

10. A method for control in accordance with claim 9, wherein the temperature measuring device is a digital temperature measuring device.

11. An apparatus for control of the temperature and quantity of water added to a mixing bowl during the mixing of batters used for muffins, cakes and the like, the apparatus comprising:
  (a) a reservoir tank for containing a desired quantity of water;
  (b) inlet valving to provide an initial quantity of water in the reservoir tank and to adjust the temperature of the initial quantity of water by adding an additional quantity of water so as to obtain a desired quantity of water at a desired temperature;
  (c) a temperature measuring device for measuring the temperature of the water in the reservoir tank; and
  (d) outlet valving connected to the reservoir tank to dispense the desired quantity of water at an adjustable controlled rate into the mixing bowl.

12. An apparatus for control in accordance with claim 11, further comprising an overflow port system on the reservoir tank to prevent overfilling thereof with water.

13. An apparatus for control in accordance with claim 12, wherein the overflow port system on the reservoir tank has a trap system therein to prevent contaminants from entering the reservoir tank.

14. An apparatus for control in accordance with claim 12, further comprising a waste line connected to the overflow port system for allowing any excess water to be drained from the reservoir tank for disposal.

15. An apparatus for control in accordance with claim 11, further comprising graduations on the reservoir tank so the desired quantity of water can be accurately measured.

16. An apparatus for control in accordance with claim 11, further comprising a bypass line connected to the outlet valving for allowing residual ingredients to be rinsed from smaller measuring containers into the mixing bowl.

17. An apparatus for control in accordance with claim 11, further comprising a waste line connected to the outlet valving for allowing any excess water to be drained from the reservoir tank for disposal.

18. An apparatus for control in accordance with claim 11, further comprising a check valve connected to the reservoir tank for allowing air to enter the reservoir tank as water is drained therefrom.

19. An apparatus for control in accordance with claim 11, wherein the temperature measuring device includes a temperature probe inserted in the water to measure the temperature thereof.

20. An apparatus for control in accordance with claim 19, wherein the temperature measuring device is a digital temperature measuring device.

* * * * *